E. L. BARTON.
VEHICLE SPRING.
APPLICATION FILED DEC. 14, 1907.
923,107.
Patented May 25, 1909.
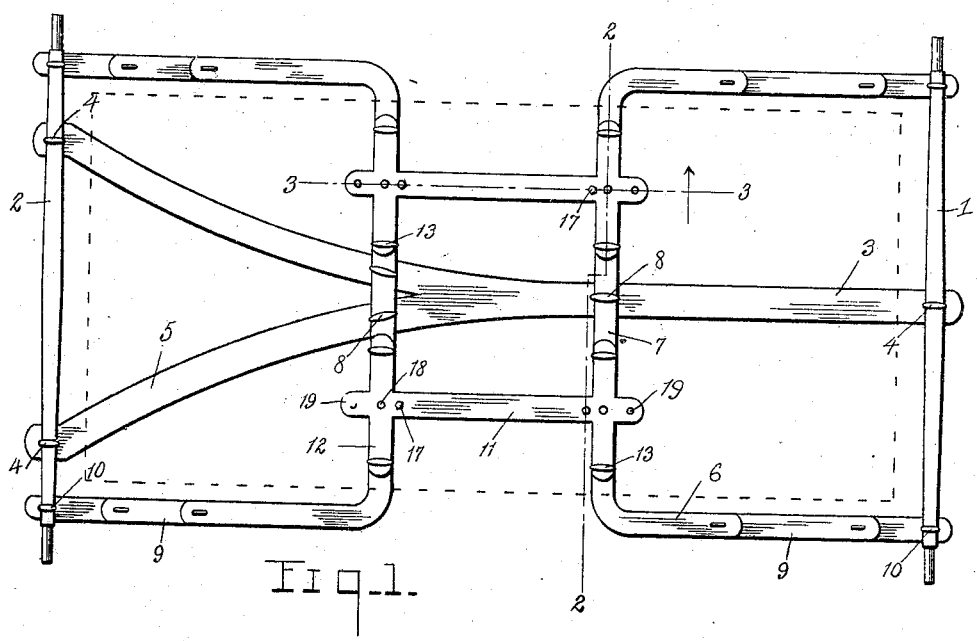
Fig. 1.
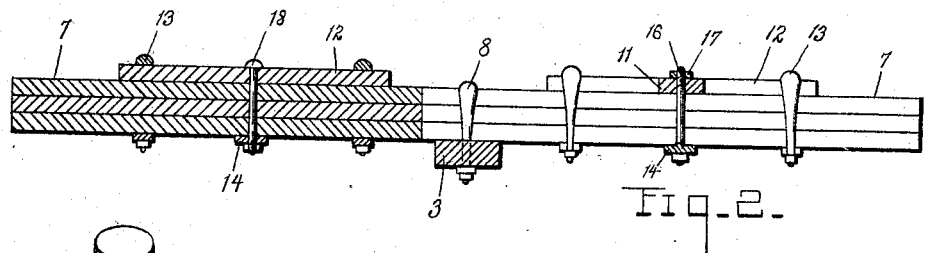
Fig. 2.
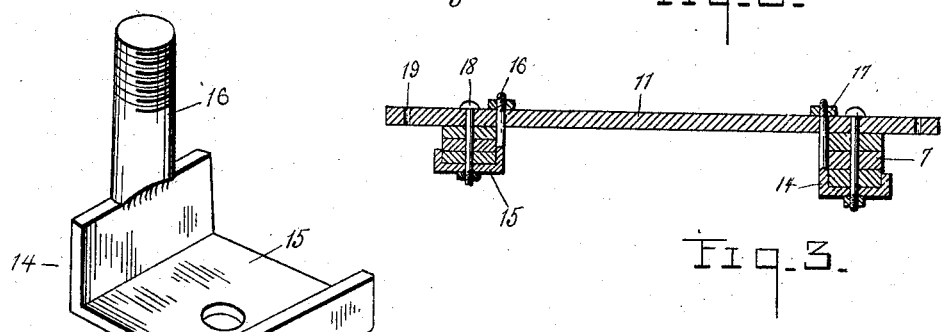
Fig. 3.
Fig. 4.
Witnesses
Chas. T. Jennings.
L. O. Little.
Inventor
Ernest L. Barton
By Watson E. Coleman
Attorney

UNITED STATES PATENT OFFICE.

ERNEST L. BARTON, OF CHESTER, SOUTH CAROLINA.

VEHICLE-SPRING.

No. 923,107.  Specification of Letters Patent.  Patented May 25, 1909.

Application filed December 14, 1907. Serial No. 406,542.

*To all whom it may concern:*

Be it known that I, ERNEST L. BARTON, a citizen of the United States, residing at Chester, in the county of Chester and State of South Carolina, have invented certain new and useful Improvements in Vehicle-Springs, of which the following is a specification, reference being had to the accompanying drawings.

My invention relates to improvements in vehicle springs.

The object of the invention is to provide a spring gear for buggies, runabouts and similar vehicles, which will have both the shorter and the full length side spring effect so that the device will be exceedingly strong and rigid and at the same time sufficiently elastic to give the proper spring to the body of the vehicle.

With the above and other objects in view, the invention consists of the novel features of construction and the combination and arrangement of parts hereinafter described and claimed, and illustrated in the accompanying drawings, in which—

Figure 1 is a plan view of my improved spring gear; Fig. 2 is a detail transverse section taken on the plane indicated by the line 2—2 in Fig. 1; Fig. 3 is a detail longitudinal section taken on the plane indicated by the line 3—3 in Fig. 1; and Fig. 4 is a perspective view of one of the clips.

In the drawings 1 and 2 denote, respectively, the front and rear axles of a vehicle and 3 denotes a longitudinal resilient member or spring arranged between them and hung from them by suitable clips or fastenings 4. The longitudinal spring or member 3 is preferably centrally disposed and it may be in the form of a straight bar or a bar having a straight front portion and a rear portion forked to provide diverging arms 5 as shown. The outer ends of the arms 5 are connected to the rear axle adjacent to its ends and their front ends unite in the straight front portion of the spring or member at a point preferably, but not necessarily, midway the length of the spring.

6 denotes two substantially U-shaped resilient end members or springs which are oppositely disposed and have their central or cross portions 7 united to the longitudinal spring or member 3 by clips 8 or other fastenings. Each of the end members or springs 6 has outwardly projecting arms 9 which are hung from the axles by clips or equivalent fastenings 10. Said springs or members 6 may be of any suitable construction but I preferably make them of three or four plies according to the strength needed to properly support the body of the vehicle, and I also preferably, but not necessarily, make the plies of the rear one slightly heavier as indicated in Fig. 3 of the drawings.

11 denotes two short resilient side connecting members or springs which unite the central or cross portions 7 of the two end members and serve both as connecting bars and braces. These connecting members 11 are arranged on opposite sides of the central or longitudinal member 3, preferably as shown in Fig. 1, and at their ends are formed cross portions or arms 12 which are adapted to engage the cross portions 7 of the members 6.

The side members or springs 11 are secured to the end members 6 by clips or equivalent fastening devices 13 arranged at the ends of the arms 12 and also by clips 14 arranged at the ends of the central or body portions of the members 11 as more clearly shown in Fig. 3. The clips 14 comprise U-shaped body portions 15 and screw threaded stems or shanks 16 which project from one side of said body portions. The latter are adapted to embrace the portions 7 of the members 6 immediately beneath the members 11 and the threaded stems 16 are passed upwardly through apertures in said members 11 to receive clamping nuts 17. The clips 14 are further secured to the members 6, 11 and the latter are more firmly united by passing bolts or similar fastenings 18 vertically through said parts as more clearly shown in Fig. 2. By providing the clips 14 and securing them as illustrated it will be seen that the members 6, 11 will be securely united in a simple and inexpensive manner. The members 11 have their extremities extended beyond the cross portions or arms 12 and apertured as at 19 to receive fastenings which unite the spring to the vehicle body.

From the foregoing it will be seen that the arrangement of the two oppositely disposed substantially U-shaped end members 6 upon the central member 3 and the arrangement of the short connecting members 11 between said end members, will give the gear both the short and the full length side spring effect, and that it eliminates the wriggling motion incident to the usual short side spring gear and produces a structure that is much stronger and more elastic than the usual full length side spring gear. It will be further noted that this improved spring gear is exceedingly strong and rigid but at the same time gives the proper resiliency or spring to the vehicle body.

Having thus described my invention what I claim is:

1. In a spring gearing of the character described, a longitudinal member, end members having central portions united to the longitudinal member in spaced relation and provided with outwardly projecting arms, connecting members arranged between the central portions of the end members and on opposite sides of the longitudinal member, said connecting members and end members being in the form of flat bars engaged with each other and having alining apertures, the connecting members having other apertures adjacent to the edges of the end members, the clips 14 having flat U-shaped body portions engaged with the end members, the connecting or central portion of the bodies of the clips being formed with apertures to aline with the first mentioned alining apertures and one of the ends or arms of each of said clips being formed with a projecting screw threaded stud to pass through the last mentioned apertures in the connecting members, nuts engaged with said screw threaded studs, and transverse fastenings passed through said alining apertures in the connecting members, the end members, and the body portions of said clips, substantially as shown and described.

2. In a spring gear of the character described, front and rear axles, end members of substantially U-shape having their cross or connecting portions spaced apart and their arms or ends projecting in opposite directions, the arms of one member being united to the front axle and the arms of the other member to the rear axle, connecting members between the spaced cross portions of the end members, and a longitudinal member having its rear end forked to provide diverging portions united to the rear axle at points between the center of the latter and the arms of the adjacent end member, said longitudinal member being united at its front to the front axle and at intermediate points to the cross portions of the end members, substantially as and for the purpose set forth.

3. In a spring gear of the character described, a longitudinal member, oppositely disposed end members having their central portions united to the central member in spaced relation and formed with arms adapted to provide short side springs, and a connecting member arranged between the end members on each side of the central member.

4. In a spring gear of the character described, a longitudinal member, oppositely disposed substantially U-shaped end members having their central or cross portions secured to the central member in spaced relation and having their arms forming side springs, and connecting members arranged between the central or cross portions of the end members, one of the connecting members being arranged on each side of the central member.

5. In a spring gear of the character described, a longitudinal resilient member or spring arranged between the front and rear axles, oppositely disposed U-shaped resilient end members or springs having their central or cross portions united to the central member in spaced relation and having their arms forming side springs and united to the front and rear axles, and connecting members arranged between the central or cross portions of the end members and formed with arms engaged with and secured to said portions of the end members, substantially as set forth.

In testimony whereof I hereunto affix my signature in the presence of two witnesses.

ERNEST L. BARTON.

Witnesses:
C. C. EDWARDS,
HELEN HOOD.